United States Patent [19]
Oliver et al.

[11] Patent Number: 5,345,431
[45] Date of Patent: Sep. 6, 1994

[54] WRITE AND ERASE ASSEMBLY FOR MAGNETO-OPTIC DRIVE APPARATUS

[75] Inventors: Thomas C. Oliver; David P. Jones, Bellvue; Leslie G. Christie, Greeley; Mark E. Wanger, Fort Collins; Thomas E. Berg, Fort Collins; Melvin C. Crane, Fort Collins, all of Colo.

[73] Assignee: Hewlett-Packard Company, Palo Alto, Calif.

[21] Appl. No.: 945,281

[22] Filed: Sep. 14, 1992

[51] Int. Cl.⁵ .............................................. G11B 13/04
[52] U.S. Cl. ...................................... 369/13; 360/114
[58] Field of Search ............... 369/13, 14, 15; 360/59, 360/114, 118; 365/122

[56] References Cited

U.S. PATENT DOCUMENTS

| | | | |
|---|---|---|---|
| 4,701,894 | 10/1987 | Watson | 369/13 |
| 4,701,895 | 10/1987 | Vansant | 369/13 |
| 4,748,606 | 5/1988 | Naito et al. | 369/13 |
| 4,962,492 | 10/1990 | Mathildus et al. | 369/13 |
| 4,977,549 | 12/1990 | Berg | 369/13 |
| 5,020,042 | 5/1991 | Fearnside et al. | 369/13 |

FOREIGN PATENT DOCUMENTS

| | | |
|---|---|---|
| 59-92406 | 9/1984 | Japan . |
| 60-2114438 | 10/1985 | Japan . |
| 61-96540 | 5/1986 | Japan . |
| 61-239449 | 10/1986 | Japan . |
| 61-278059 | 12/1986 | Japan . |
| 62-78754 | 4/1987 | Japan . |
| 63-32755 | 2/1988 | Japan . |

Primary Examiner—Robert J. Pascal
Assistant Examiner—Tan Dinh

[57] ABSTRACT

A write-erase magnet assembly for a data storage device including: a permanent magnet having a longitudinal axis and having a first longitudinally extending face portion with a first polarity and a second longitudinally extending face portion with a second polarity opposite the first polarity for alternately producing write and erase magnetic bias fields on an adjacently positioned data storage medium; a magnet support assembly for rotatably supporting the permanent magnet; a magnetic detent fixedly positioned relative to the longitudinal axis of the permanent magnet for magnetically producing a biasing torque on the magnet tending to orient the closer of the first and second face portions of the permanent magnet in adjacent relationship with the detent. A coil for applying flipping torque and braking torque for an eddy current rotation dampening assembly are also disclosed.

13 Claims, 8 Drawing Sheets

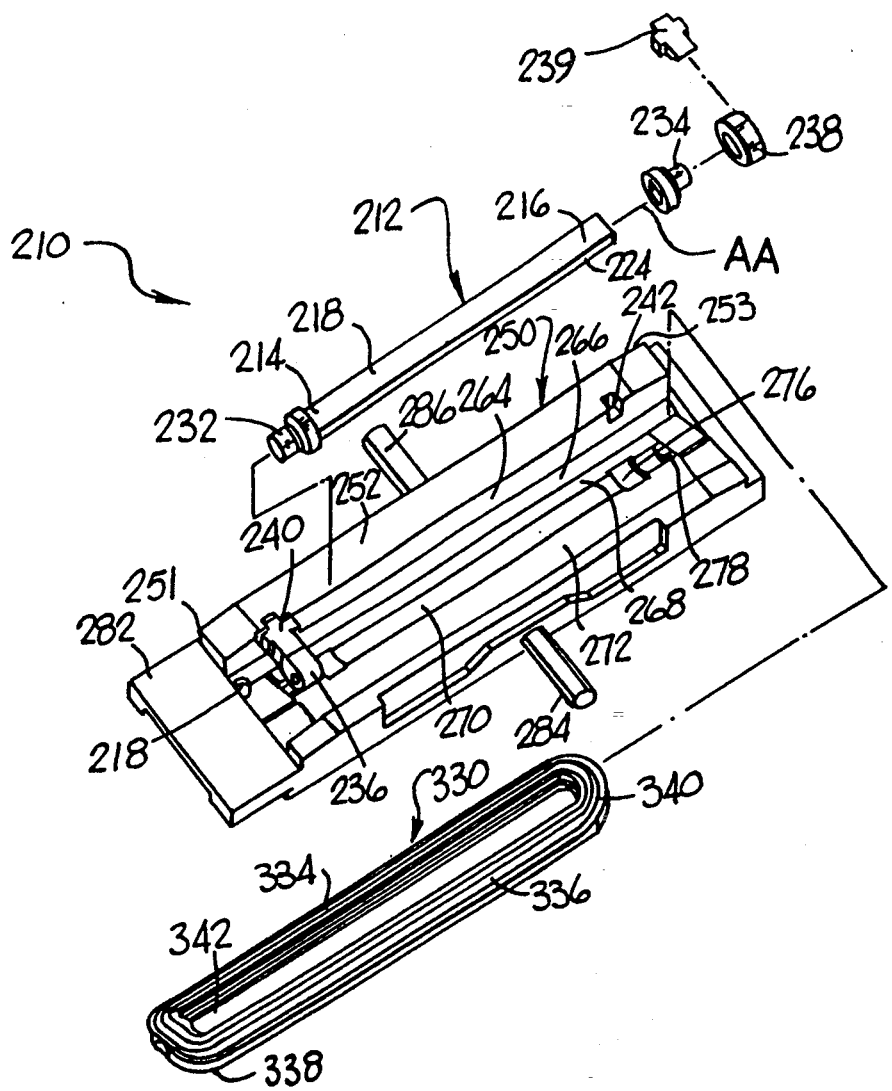
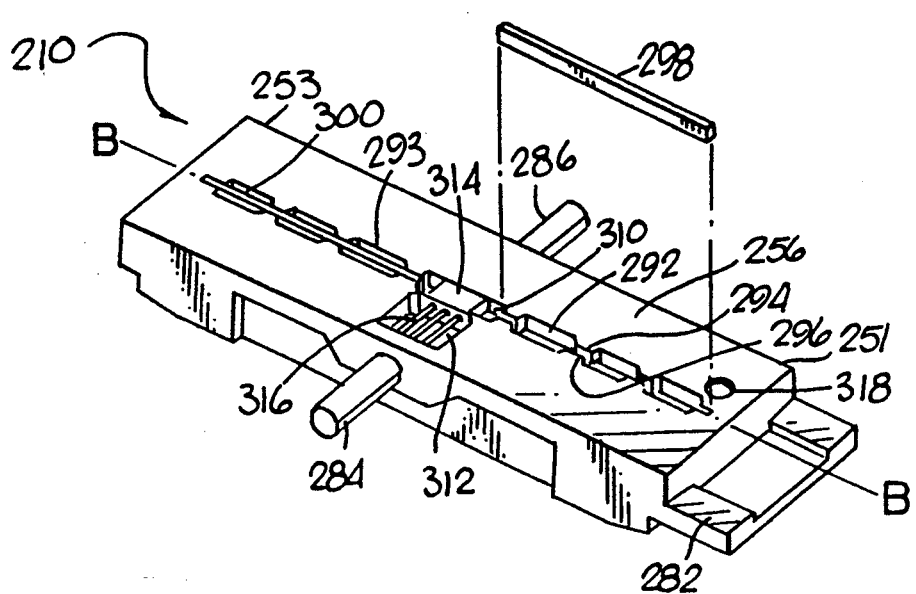
FIG.5
FIG.6

WRITE AND ERASE ASSEMBLY FOR MAGNETO-OPTIC DRIVE APPARATUS

BACKGROUND OF THE INVENTION

This invention relates generally to a magneto-optic drive apparatus and more particularly to a write-erase magnet assembly for such apparatus.

It is known in the art to write information from an optical disk by heating a point on the disc with a laser beam while exposing it to a magnetic field oriented in a first direction and to erase information by heating a point on the disk while exposing it to a magnetic field oriented in a direction opposite the first direction. Various assemblies for producing a reversible magnetic field for writing and erasing an optical disk are known in the art. See, for example, U.S. Pat. Nos. 4,977,549 issued Dec. 11, 1990 of Thomas E. Berg and U.S. Pat. No. 5,132,944 issued Jul. 21, 1992 of Thomas E. Berg which are both hereby specifically incorporated by reference for all that is disclosed therein.

SUMMARY OF THE INVENTION

The present invention is directed to a write-erase magnet assembly for a magneto-optical drive. The magnet assembly comprises a permanent magnet having a longitudinal axis and having a first longitudinally extending face portion with a first polarity and a second longitudinally extending face portion with a second polarity opposite the first polarity. The magnet is supported in a housing such that it is freely rotatable about its central longitudinal axis. A magnetic detent assembly is fixedly positioned relative to the longitudinal axis of the permanent magnet and magnetically coacts with the permanent magnet to produce a biasing torque tending to orient the poles of the magnet in a vertical plane with the closer of the first and second face portions of the magnet positioned in adjacent relationship with the detent assembly. The permanent magnet may be flipped between a first biased position, which may be a writing position, with the first face portion positioned adjacent to the magnetic detent assembly and a second biased position, which may be an erasing position, with the second face portion positioned adjacent to the magnetic detent assembly.

An electromagnet may be positioned proximate to the permanent magnet for applying a magnetic torque for flipping the permanent magnet between the first and second biased positions. The electromagnet may be a coil disposed about the permanent magnet and configured to produce a relatively high initial torque on the permanent magnet when it is in either of its biased positions and to produce a negative or "braking" torque on the permanent magnet after it has rotated through a portion of its flip cycle.

The write-erase magnet assembly may include eddy current dampening structure adapted to provide braking torque to decelerate and dampen the oscillation of the permanent magnet as it approaches the end of a flip cycle. The eddy current dampening structure may include the permanent magnet housing and the electromagnetic coil itself when it is in a deenergized state.

A sensing system is provided for sensing the relative rotated position of the permanent magnet. A control system is provided which is responsive to signals from the sensing system and which generates control signals to provide a pulse of energy to energize the coil to initially rotationally accelerate the permanent magnet at the beginning of a flip cycle and a pulse of energy to decelerate the permanent magnet near the end of a flip cycle. With this assembly the permanent magnet may be flipped from one biased position to the other and stabilized sufficiently for writing or erasing operations very quickly.

BRIEF DESCRIPTION OF THE DRAWINGS

An illustrative and presently preferred embodiment of the invention is shown in the accompanying drawings in which:

FIG. 5 is an exploded bottom perspective view of a write and erase magnet assembly.

FIG. 6 is an exploded top perspective view of the write and erase magnet assembly.

DETAILED DESCRIPTION OF THE INVENTION

Figure 1:
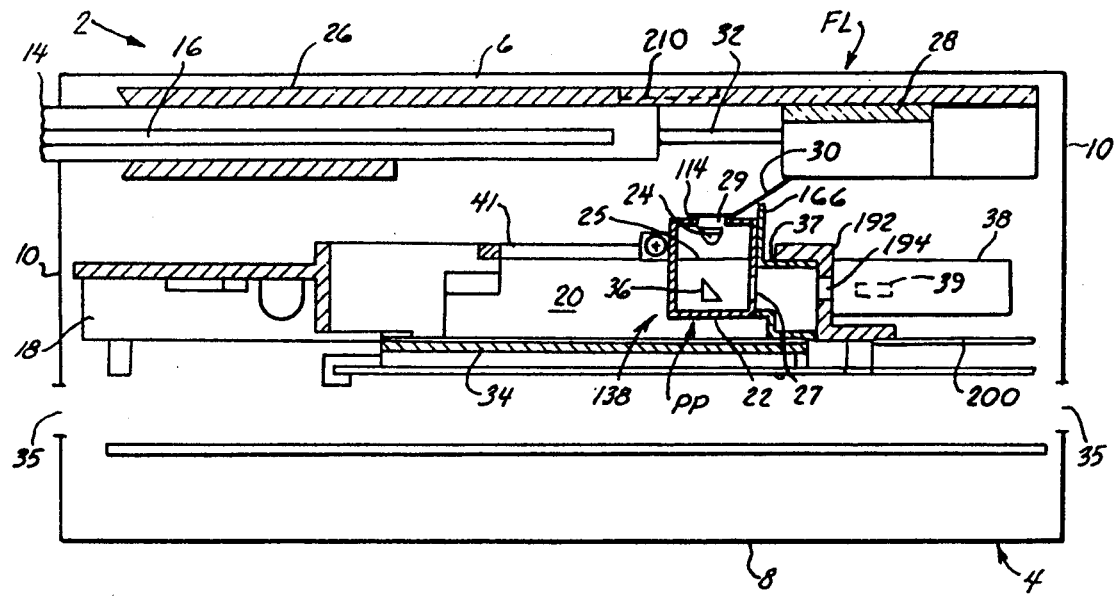
FIG. 1 is a schematic illustration of the invention with a cartridge partially loaded into the magneto-optic drive apparatus.
Figure 2:
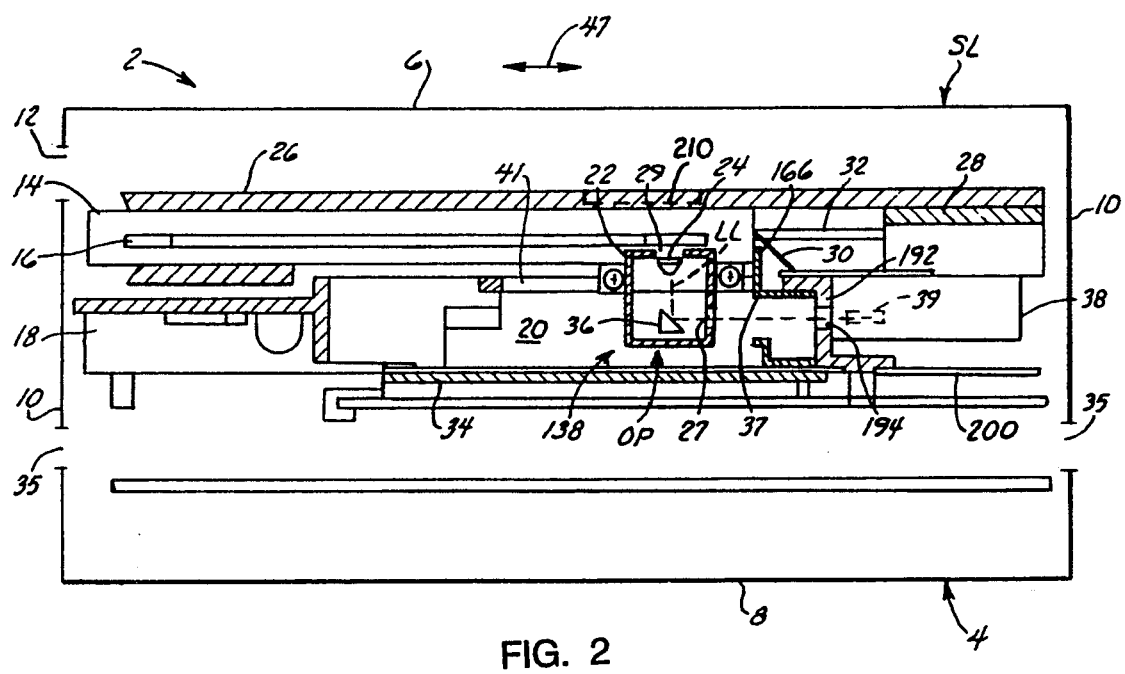
FIG. 2 is a schematic illustration of the invention with a cartridge fully loaded into the magneto-optic drive apparatus.

In FIG. 1, there is schematically illustrated magneto-optic drive apparatus 2 of this invention. A housing 4 is provided and has a top wall portion 6, a bottom wall portion 8 and sidewall portions 10. An opening 12 is formed in one of the sidewall portions 10 so that a cartridge 14 having a disk 16 contained therein may be loaded into the magneto-optic drive apparatus 2. Frame means 18 are fixedly mounted on the housing 4. The frame means 18 have an opening 20 in which are mounted support means 22 for supporting an optical assembly 138 comprising a read/write lens 24 and turning lens 36 and lens enclosure 22 for movement between a parked position PP (FIG. 1) and an operating position OP (FIG. 2). The lens enclosure 22 may comprise a right regular parallelepiped shaped member having an interior cavity for receiving the read/write lens 24 and the turning lens 36. The lens enclosure member 22 has a rear opening 27 therein adjacent a turning lens 36 and a top opening 29 therein adjacent a read/write lens 24 but is otherwise closed on all sides. The optical assembly 138 including enclosure member 22, read/write lens 24 and turning lens 36 is sometimes referred to herein as an optical head 138. Optical heads such as described generally above are known in the art. See, for example, U.S. Pat. No. 4,977,549 of Thomas E. Berg for WRITE AND ERASE MAGNETIC BIAS FIELD SWITCHING SYSTEM FOR A MAGNETO-OPTIC DISK DRIVE, issued Dec. 11, 1990, which is hereby specifically incorporated by reference for all that it describes.

Figure 3:
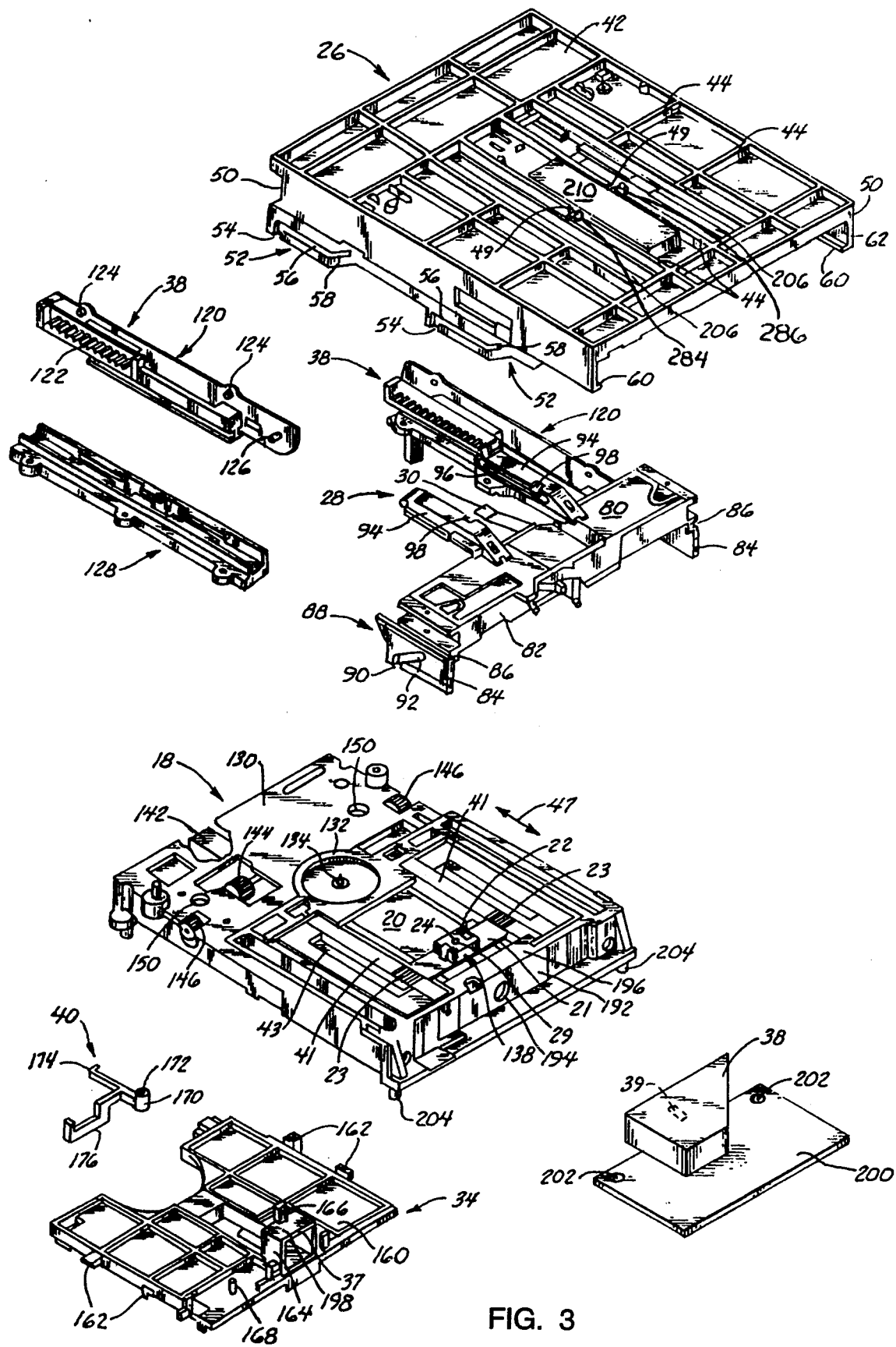
FIG. 3 is an exploded top perspective view of several portions of the apparatus of this invention.

As best shown in FIG. 3 the lens enclosure member 22 is mounted on a cross member 21 which is in turn attached at opposite ends thereof to electric coils 23. The coils 23 encircle and are slidably mounted on the support means which may comprise elongate coil member 41. The coil members 41 are magnetized by a permanent magnet 43 and associated pole piece 45. By providing current through coils 23 in an opposite direction the coils and thus the optical head 138 is selectively caused to move forwardly or rearwardly as indicated at 47. Such displaceable assembly for an optical head is generally referred to as a linear motor and is conventional and well known in the art.

A carrier 26 is mounted on the frame means 18 and is connected thereto to permit the carrier 26 to move in vertical directions relative to the frame means 18 but to prevent substantially any relative movement between the carrier 26 and the frame means 18 in horizontal directions. A shuttle 28 is mounted on the carrier 26 so that the shuttle 28 may move in linear horizontal directions relative to the carrier 26 and in linear vertical directions with the carrier 26. A strip 30 of flexible resilient material is secured to the shuttle 28 for movement therewith. The shuttle 28 moves between a first location FL (FIG. 1) whereat a portion of the strip of relatively flexible material 30 covers the read/write lens 24 and a second location SL (FIG. 2) whereat it permits the operation of the read/write lens 24. Pivotally attached to the shuttle 28 are shutter operating arms 32 (FIG. 4) which function to open or close a shutter, described below, on the cartridge 14.

The turning lens 36 is protected when in the parked position by a protection means 37 mounted at a fixed location. The protection means 37 may comprise a tunnel structure 164, FIG. 3, which abuts at an open end thereof against a rear wall portion of the support means 22 in the area around opening 27 to provide a cover extending horizontally outwardly from opening 27. The protection means 37 protects the turning lens 36 and also optical components in optical module 38 from dust. The optical module 38 is mounted at a fixed location and has a laser light source (not shown) and splitting lens 39 mounted therein. A laser path LL extends from the laser through the splitting lens 39, the turning lens 36 and the read/write lens 24 to the disk 16 during a reading or writing operation. In operation, the shuttle 28, in an unloaded state, is located in the position illustrated in FIG. 1 with the strip 30 of flexible material covering the read/write lens 24. A cartridge 14 is inserted into the carrier 26 and moves into contact with the shutter operating arms 32. As the cartridge 14 continues to be inserted, the shutter operating arms 32 function to open the cartridge shutter to uncover a cartridge opening and expose a portion of the cartridge disk 16. This position is illustrated in FIG. 1. When the shutter has been fully opened, a signal is generated and functions to start an electric motor, described below. The electric motor moves the shuttle 28 from the first location FL, FIG. 1, to the second location SL, FIG. 2. The continued operation of the electric motor moves the carrier 26 and the shuttle 28 downwardly from the position illustrated in FIG. 1 to the position illustrated in FIG. 2. At the position illustrated in FIG. 2, a write and erase magnet assembly 210 mounted in the carrier 26 is positioned directly above the opening in cartridge 14. At the same time that the carrier is moving to the position shown in FIG. 2, the optical head 138 including the read/write lens 24 and turning lens 36 move from the parked position PP of FIG. 1 to the operating position OP of FIG. 2. The optical head 138, magnet assembly 210, and other components of the apparatus 2 then function to perform a reading or writing operation. After the reading or writing operation has been performed, an eject button (not shown) is pushed to activate the electric motor. The read/write lens and turning lens are then returned to the parked position, the carrier 26 and the shuttle 28 are moved upwardly, the shuttle 28 is moved back to its position of FIG. 1 so that the portion of the strip of flexible resilient material is covering the read/write lens 24 and so that protection means 37 encompasses opening 27 to protect turning lens 36. The cartridge 14 is then pulled out of the carrier 26. As the cartridge 14 is pulled out, the shutter operating arms 32 function to close the shutter. Thus, the portion of the strip 30 of flexible resilient material 30 functions to cover the read/write lens 24 and protection means 37 protects the turning lens 36 at all times when the optical head 138 is in the parked position to prevent dust from falling thereon including the period when the drive is being loaded with a cartridge, the period when a cartridge is being unloaded from the drive and also the period between unloading of one cartridge and loading of the next cartridge. A dust air baffle 34 covers the lower part of the opening 20 to prevent dust from cooling air flowing through openings 35 in the sidewall portions 10 from contaminating the read/write lens 24 or turning lens 36.

In FIG. 3, there is illustrated the carrier 26, the carrier and shuttle moving means 38, the shuttle 28, the frame 18, the dust air baffle 34 and the releasable locking means 40. The carrier 26 has a top wall portion 42 with reinforcing bars 44 dividing it into a plurality of compartments. Write and erase magnet assembly 210 is mounted in one of the compartments and has two studs 284, 286 projecting outwardly from opposite sides and extending through recesses 49 for purposes described below. Two sidewall portions 50 extend downwardly from the top wall portion 42 and each sidewall portion has two spaced apart cam grooves 52 formed therein. Each cam groove 52 has an entrance portion 54, a generally horizontal portion 56 and an inclined portion 58. Each sidewall portion 50 has a horizontally extending support rail 60 on its inner surface 62 for purposes described below. The carrier 26 has a bottom wall portion 64 (FIG. 4) that cooperates with the top wall portion 42 and the sidewall portions 50 to form an opening 66 through which the cartridge 14 is inserted, FIG. 4. The bottom wall portion 64 also functions to support the cartridge 14. A pair of spaced apart posts 68, FIG. 4, project downwardly from the bottom wall portion 64 for purposes described below.

Figure 4:
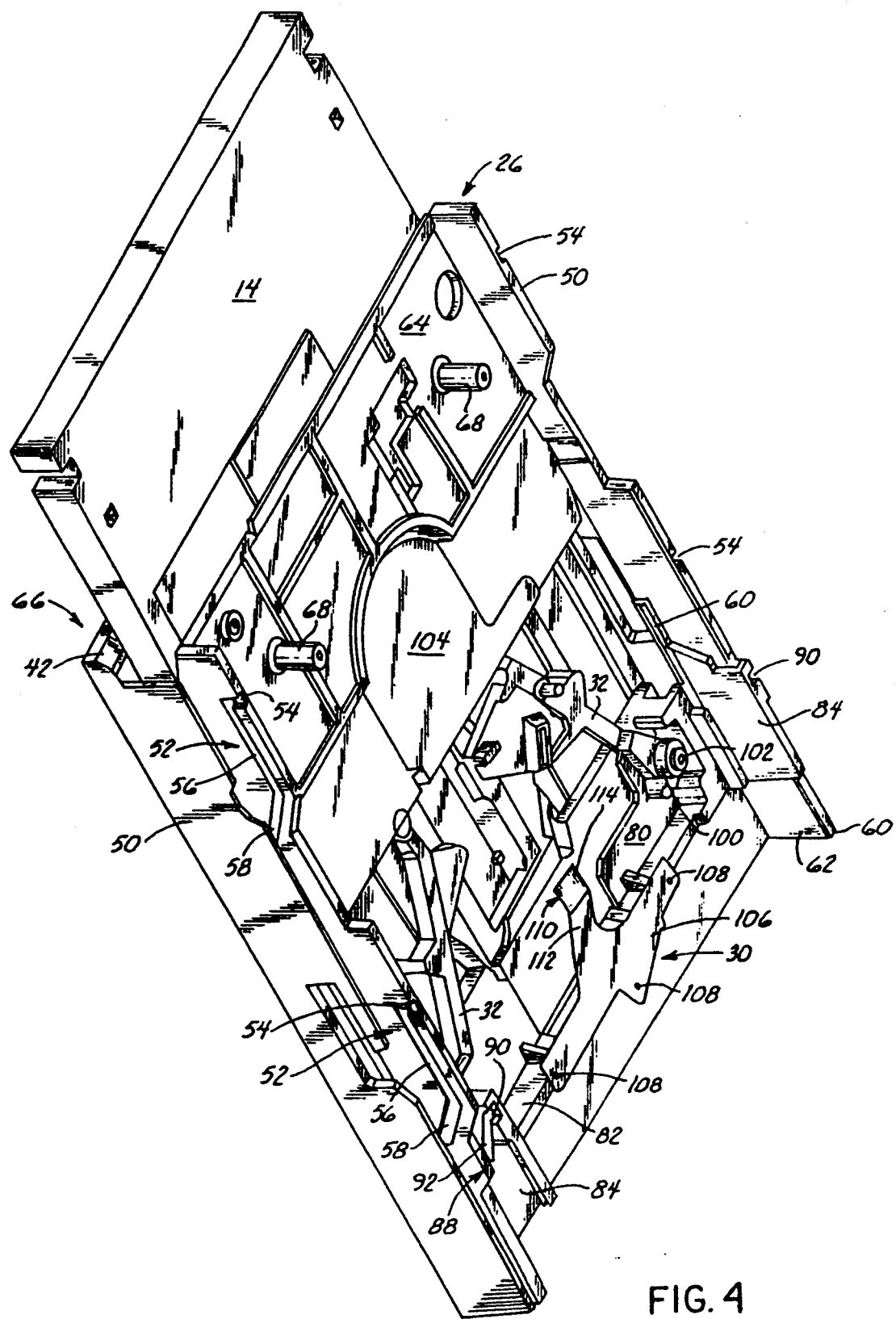
FIG. 4 is a bottom perspective view of some of the portions of FIG. 1.

The shuttle 28 has a top wall portion 80, FIGS. 3 and 4, a back wall portion 82, and two sidewall portions 84. A groove 86 is formed in each sidewall portion 84 and is dimensioned so that the rail 60 fits therein to support the shuttle 28 for sliding movement. A cam groove 88 is formed in each sidewall portion 84 and has an entrance portion 90 and an inclined portion 92 for purposes described below. A pair of spaced apart arms 94, FIG. 3, project outwardly from the top wall portion 80 and each arm 94 has a groove 96 formed therein and each groove 96 is dimensioned to receive a stud 48 for permitting limited movement therein. Each groove 96 has an entrance portion 98. Conventional shutter operating arms 32 are mounted on posts 100, one of which is illustrated in FIG. 4, and are urged in directions away from each other by spring means 102. As described above, as the cartridge is inserted into the magneto-optic drive apparatus 2, the shutter operating arms function to open the shutter 104, FIG. 4. The strip 30 of flexible material has a base portion 106 that is secured to the back wall portion 82 by suitable means, such as an adhesive or rivets 108. A tongue portion 110 projects outwardly from the base portion 106 and has an inclined portion 112 and a generally horizontal portion 114 FIGS. 1 and 4.

As shown in FIG. 3, the carrier and shuttle moving means 38 has a pair of elongated bars 120, each of which has a rack gear 122 mounted thereon. Each elongated bar 120 has a pair of spaced apart cam followers 124 which are dimensioned to fit into the cam grooves 52 and a cam follower 126 which is dimensioned to fit into cam groove 88. Each elongated bar 120 is mounted on a base member 128 which is secured on the frame means 18 to provide for linear sliding movement of the elongated bar 120 on the base member 128.

The frame means 18 comprises a casting 130 having a cavity 132 formed therein and in which disk drive means (spindle assembly) 134 are positioned. As previously described, the support means, which comprise a pair of spaced apart rails 41, are mounted in the opening 20 and the optical assembly 138 is mounted for sliding movement over the rails 41. The read/write lens 24 is beneath an opening 29 in the lens enclosure member 22 of the optical assembly 138. Coils 23 are controllably energized to control the movement of the optical assembly 138 over the rails 41.

A reversible electric motor 142 is mounted on the casting 130 and is connected to gears 144 which function to rotate pinion gears 146 which are in mesh with rack gears 122 so that rotation of the reversible electric motor 142 moves the elongated bars 120. A pair of spaced apart openings 150 are formed in the casting 130 and are dimensioned to receive the posts 68 of carrier 26, FIG. 4, so as to prevent any substantial horizontal movement between the casting 130 and the carrier 26 but to permit movement of the carrier 26 in generally vertical directions relative to the casting 130.

The dust air baffle 34 comprises a plate member 160 that is dimensioned to cover the opening 20 in the casting 130. The plate member 160 has a plurality of lugs 162 for securing it to the bottom surface of the casting 130. The protection means 37 comprises a tunnel structure 164 which projects upwardly from the plate member 160 and an abutment member 166 projects upwardly from the tunnel structure 164 for purposes described below. A post 168 projects upwardly from the plate member 160. The releasable locking means 40 has a portion 170 having a bore 172 extending therethrough and dimensioned to receive the post 168 and be rotatably mounted thereon. A hook portion 174 projects outwardly from the portion 170 and is located to engage a portion of the optical assembly 138 to hold it in the parked position of FIG. 1. A release lever 176 extends outwardly from the portion 170 and is located to be contacted by a portion of the shuttle 28 as it moves from the first location FL to the second location SL.

The optical module 38 is mounted on the sidewall 192 of the frame means 18 by suitable means (not shown) so that the splitting lens 39 is aligned with the opening 194 in the sidewall 192. A flange portion 196 projects inwardly from the sidewall 192. When the dust cover 34 is mounted on the frame means 18, the upper surface 198 of the tunnel structure 164 contacts the lower surface of the flange portion 196. An air baffle 200 is located below the optical module 38 and has openings 202 so that the air baffle 200 can be mounted on the studs 204 on the frame means 18. The magneto-optic drive apparatus 2 is assembled by passing the support arms 94 upwardly through slots 206. The shuttle 28 is rotated to align the grooves 86 with the support rails 60. The shuttle 28 is moved forwardly until it is supported on the support rails 60. The shuttle 28 is move to align the recesses 49 with the openings 98. The studs 284, 286 of the write and erase magnet 210 are passed through the aligned recesses 49 and the openings 98. The shuttle is then moved so that the studs 284, 286 move into the grooves 96. The entrance portions 54 on the carrier 26 are aligned with the cam followers 124 and the entrance portion 90 on the shuttle 28 is aligned with the cam follower 126 and the carrier 26 and shuttle 28 are moved downwardly so that the cam followers 124 enter the cam grooves 88 and the posts 68 move into the openings 150. This locates the apparatus as illustrated schematically in FIG. 1.

When it is desired to perform a reading or writing operation, a cartridge 14 is inserted into the carrier 26, FIG. 1. As the cartridge moves inwardly it contacts the shutter operating arms 32, FIGS. 1 and 4 and the continued movement of the cartridge 14 opens the shutter 104. At this time, signal generating means (not shown) start the electric motor 142 which rotates pinion gears 146 to move the rack gear 122 and the cam followers 124 and 126, FIG. 3. The cam followers 124 move along the horizontal portions 56 so that they apply no force on the carrier 26. The cam follower 126 applies a force on the shuttle 28 to move the shuttle rearwardly. As the shuttle 28 moves rearwardly, the tongue portion 110 is gradually moved so that it no longer covers the read/write lens 24 and contacts the release lever 176 to release the locking means 40. The movement of the rack gear 122 is continued and the cam followers 124 begin to move over the inclined portions 58 and the cam followers 126 move over the inclined portions 92 to move the carrier 26 and the shuttle 28 downwardly toward the read/write lens 24. The downward movement is stopped when the carrier 26 and the shuttle 28 are located as schematically illustrated in FIG. 2. As the shuttle 28 moves downwardly, the tongue portion 110 contacts the abutment member 166 and is pivoted around a generally horizontal axis to move upwardly to a position where it will not interfere with the operation of the read/write lens 24. During a writing operation a permanent magnet in the write-erase magnet assembly 210 is alternately rotated between write and erase positions as described in further detail below. After the reading or writing operation has been completed the read/write lens 24 is moved to the parked position PP, the electric motor is actuated and the rack gear 122 moves in the opposite direction. The carrier 26 and the shuttle 28 move upwardly and the shuttle 28 moves forwardly to move the cartridge 14 slightly out of the housing and to move the tongue portion 110 into the protecting position over the read/write lens 24. The cartridge 14 is then removed from the carrier 26 and as it is removed the shutter operating arms 32 function to close the shutter 104. Therefore, when the optical assembly 138 is in the parked position, the read/write lens 24 is protected by the tongue portion 110. The optical assembly 38 remains in the parked position during the opening and closing of the shutter 104 associated with the loading and removal of a cartridge into and out of the drive. The optical assembly 138 also remains in the parked position during periods when there is no cartridge in the drive apparatus 2. The read/write lens 24 is protected by tongue portion 110 and the turning lens 36 is protected by member 37 during all of these periods.

Write-Erase Flip Magnet Assembly

FIGS. 5–8 illustrate the construction of one embodiment of a write and erase magnet assembly 210 of the present invention. The write and erase magnet assembly comprises an elongate permanent bar magnet 212 having a right regular parallelepiped shape. The bar magnet 212 has a central longitudinal axis AA extending between a first end portion 214 and a second end portion 216 thereof. The bar magnet has a first face portion 218, a second face portion 220 perpendicular to face portion 218, a third face portion 222 parallel and opposite to first face portion 218, and a fourth face portion 224 perpendicular to first face portion 218, FIG. 8. The bar magnet is magnetized such that the magnetic north pole is positioned at first face portion 218 and the magnetic south pole is positioned at third face portion 222. A central pole plane PP passes through the north and south poles of the magnet and contains bar magnet central longitudinal axis AA. In one preferred embodiment in which the write and erase magnet assembly is employed in a 5.25 inch magneto-optic drive, in which the optical disk to be written/erased is positioned 0.205 inches below the bar magnet, the bar magnet has a length of 1.535 inches, a width of 0.098 inches, a thickness of 0.118 inches, and a magnetic strength of 325±40 Gauss. The bar magnet may be constructed from Neodymium Iron Boron (NdFeB), 35 Mega Gauss Oersted (MGOe) or better.

Figure 7:
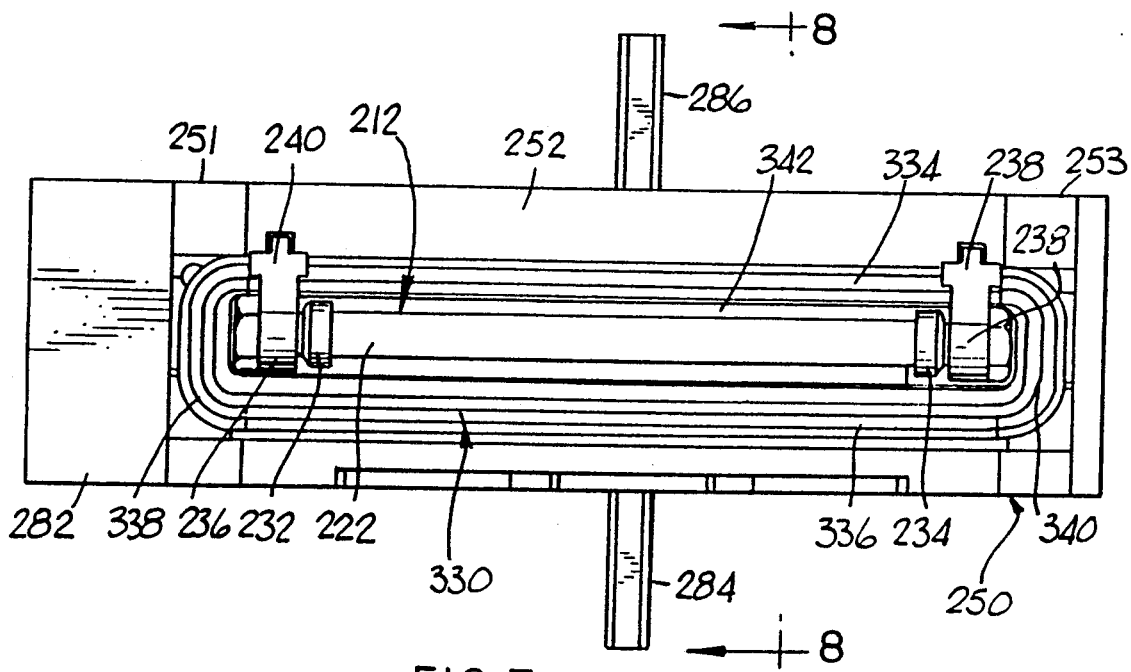
FIG. 7 is a bottom plan view of the write and erase magnet assembly.

As best shown in FIGS. 5 and 7, first and second spindle members 232, 234 are fixedly mounted at the end portions 214, 216 of the bar magnet 212 in alignment with central longitudinal axis AA. End portions of the spindle members 232, 234 are in turn received in press fit relationship with bearing units 236, 238. Bearing units 236, 238 are supported in pocket(s) 278 of a magnet support frame 250. Bearing keeper units (chocks) 239, 240 are located relative to the bearing units by groove 242 in support frame 250, and secure the bearing units to the support frame. Epoxy glue is placed in slots 242 to bond the chocks in place. Bar magnet 212 is thus mounted for rotation relative to the support frame about its central longitudinal axis AA.

The magnetic support frame 250 is preferably formed from a unitary aluminum member. The magnetic support frame comprises a first end portion 251, a second end portion 253, a bottom portion 252, a first lateral side portion 254, a top portion 256, and a second lateral side portion 258, FIGS. 7 and 8.

The bottom portion 252 has a cavity 262 therein adapted to receive the elongate permanent bar magnet 212 and associated spindle members and bearing units and an electrical coil 330. The top portion cavity is defined generally by a vertical, flat sidewall portion 264; an inclined, flat top wall portion 266; an inclined, flat sidewall portion 268; an inclined, arcuate sidewall portion 270; a horizontal, flat shelf wall portion 272; and a vertical, flat sidewall portion 274, FIG. 8, which each extend along most of the length of the cavity. The cavity is further defined by a pair of arcuate, spindle receiving recesses 276 and a pair of arcuate, bearing receiving recesses 278, FIG. 5.

The magnetic support frame comprises a tongue portion 282 extending outwardly from end portion 251 thereof which facilitates mounting of the magnet support frame in the optical drive. The magnet support frame also includes two laterally outwardly extending shaft portions 284, 286 which are also adapted to facilitate mounting of the support frame in the optical drive.

Figure 8:
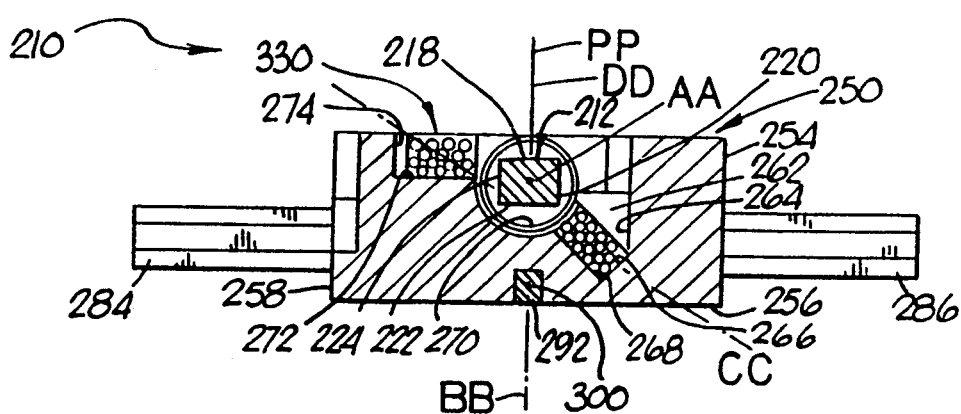
FIG. 8 is a cross sectional, bottom side up, elevation view of the write and erase magnet assembly.

Two elongate grooves 292, 293 having a common axis BB are provided in the top portion 256 of the support frame 250 as best illustrated in FIGS. 6 and 8. The grooves 292, 293 common axis BB is positioned parallel to and directly above longitudinal axis AA of bar magnet 212 when the bar magnet is mounted in the support frame. The two elongate grooves 292, 293 comprise a plurality of closely oppositely positioned tooth pairs 294, 296 which are adapted to provide a resistance fit with elongate magnetic detent bars 298, 300 which are received in the grooves 292, 293. The magnetic detent bars 298, 300 may each be constructed from 1010 C.R.S. (cold rolled steel) and may each have a length of 0.925 inches, a width of 0,039 inches, and a thickness of 0.059 inches. The magnetic detent bars are not magnetized but are adapted to attract and bias the bar magnet in either a north-pole-up or a south-pole-up orientation.

Central recesses 310, 312 are also provided in top portion 256 of magnet frame member 250, as shown by FIG. 6. A sensor 314 for detecting the relative rotation position of bar magnet 212 is mounted in central recess 310, and the leads 316 thereof extend into recess 312. In one preferred embodiment, the rotation position sensor comprises a Hall effect device.

A hole 318, FIGS. 5 and 6, extends through the top portion 256 into the bottom portion cavity 262 and enables leads (not shown) from an electric coil 330 to pass therethrough and be connected to a power source.

As best illustrated in FIGS. 5, 7 and 8, an electric coil 330 is provided by a plurality of coil windings. In a preferred embodiment of the invention, the electric coil has a generally elongated torus configuration and may include 120 windings of copper wire having a diameter of 0.008 inches (32 American Wire Gage). The electric coil 330 comprises a first elongate portion 334 and a second elongate portion 336 which extend parallel to the longitudinal axis AA of the permanent magnet 212. The coil comprises a first end portion 338 and a second end portion 340 which are both bent in a manner to enable the first elongate portion 334 to rest on surface portion 268 of cavity 262 and to enable second elongate portion 336 to rest on shelf surface portion 272 of elongate cavity 262. The electric coil 330 has a central opening 342 therein adapted to receive elongate bar magnet 212 in circumscribing relationship, as best illustrated in FIG. 3. The coil 350 may be secured within the cavity in the position illustrated in FIGS. 7 and 8 by appropriate adhesive or other conventional means well-known in the art. The first and second elongate portions 334, 336 are situated in cavity 262 such that a plane CC passing through the center of each elongate portion (hereinafter referred to as the central longitudinal plane of the coil) intersects a vertical plane DD passing through axes AA and BB at approximately 45°.

Operation of Flip Magnet Assembly

Figure 9:
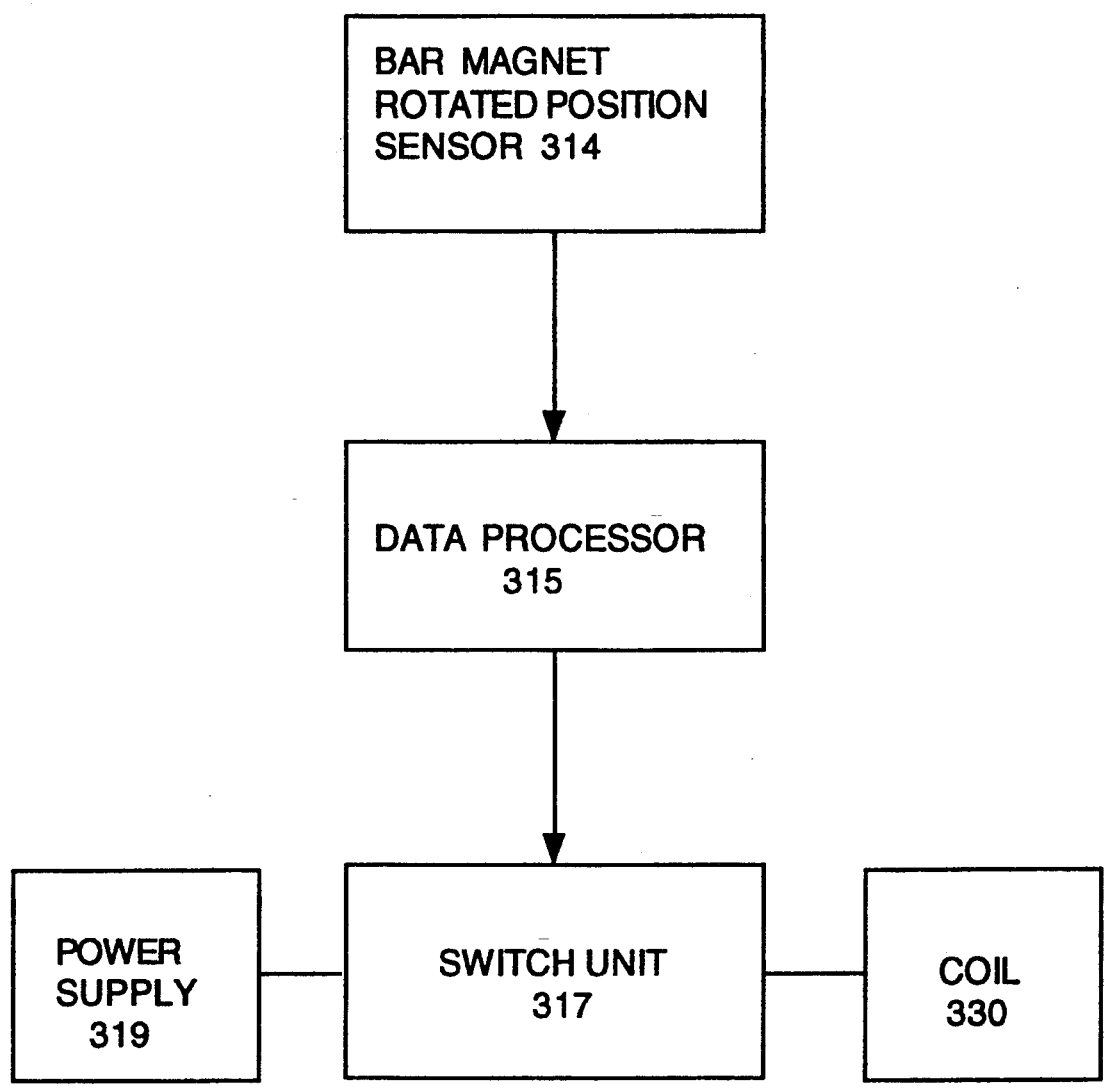
FIG. 9 is a block diagram illustrating a control assembly of a write and erase magnet assembly.

As illustrated in FIG. 9, a sensor signal from the bar magnet rotation position sensor 314 is provided to a data processor 315. The data processor processes this signal to determine the exact instantaneous rotated position of the bar magnet. Based upon the rotated position of the bar magnet, the data processor sends command signals to a conventional electric coil switching assembly 317 to connect or disconnect (or short circuit) the coil from an electric power supply 319 to energize or deenergize the electric coil 330. The data processor may be a conventional digital computer which implements processing in software or firmware, or may comprise conventional electrical circuitry, or may comprise a combination of software, firmware, and/or circuitry. The electric power supply may be a 12 Volt, 1 Amp power source.

Figure 10:
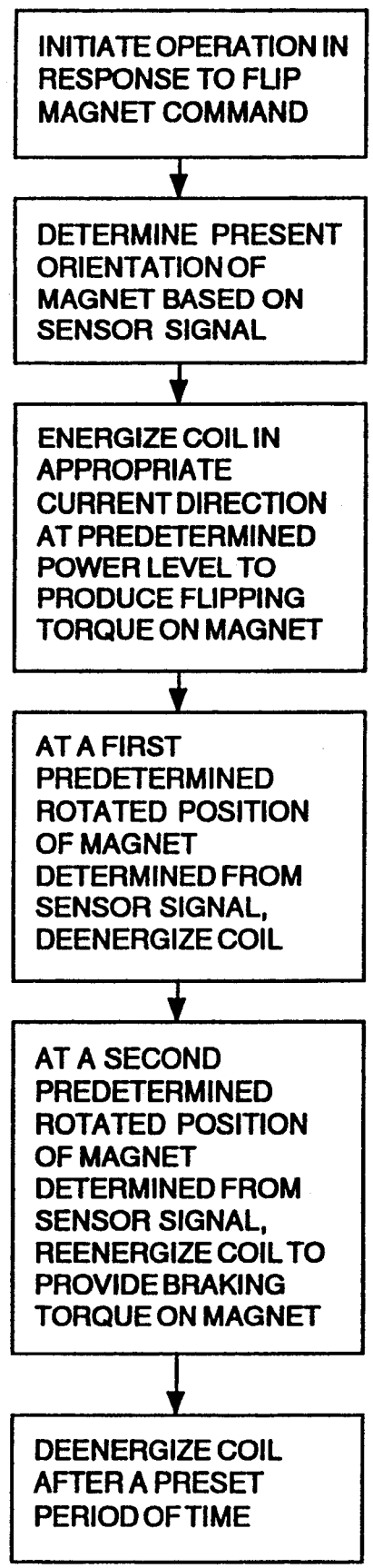
FIG. 10 is a block diagram illustrating basic operations performed by a data processor in a control module for a write and erase magnet assembly.

The basic operation performed by the data processor is illustrated in FIG. 10. The data processor initially receives a flip magnet command signal from associated software or circuitry of the optical drive unit. In response to this command, the data processor continuously monitors the sensor signal from sensor 314 and continuously determines the instantaneous rotated position of the bar magnet based upon this sensor signal. Due to the attraction between the bar magnet 212 and the magnetic detent bars 298, 300, the flip magnet will be in either a north-pole-up or a south-pole-up orientation when a flip command is received. Initially, the data processor determines whether the bar magnet is in a north-pole-up or north-pole-down orientation based upon the sensor signal. In one preferred embodiment of the invention, the coil is energized so as to rotate the bar magnet in the same direction, e.g. clockwise, to flip it from a north-pole-up to a south-pole-up orientation and also to flip it from a south-pole-up to a north-pole-up orientation. Thus, the data processor initially determines the appropriate coil current direction needed to flip the magnet in the proper direction, e.g. clockwise, based upon the north-pole-up or south-pole-up orientation of the magnet. A command is then issued by the data processor to energize the electric coil in the determined current direction at a preset power level.

As a result of the initial inclination of the central longitudinal plane CC of the coil with the longitudinal pole plane PP of the bar magnet 212, the bar magnet experiences an initial, relatively high flipping torque as illustrated in FIG. 4. Curve $T_c$, in solid and dashed lines, in FIG. 4 illustrates the torque which coil 330 would produce on bar magnet 212 if it were continuously energized as the bar magnet rotates from a north-pole-up orientation (0°) to a north-pole-down orientation (180°). However coil 330 is not continuously energized during a flip cycle. The portion of the curve shown in solid line indicated the periods during which the coil is energized and the portion of the curve shown in dashed lines indicated the periods during which the coil is not energized. The hatched areas in FIG. 4 are representative of the energy applied to the bar magnet to the coil during a 180° flip cycle.

Figure 11:
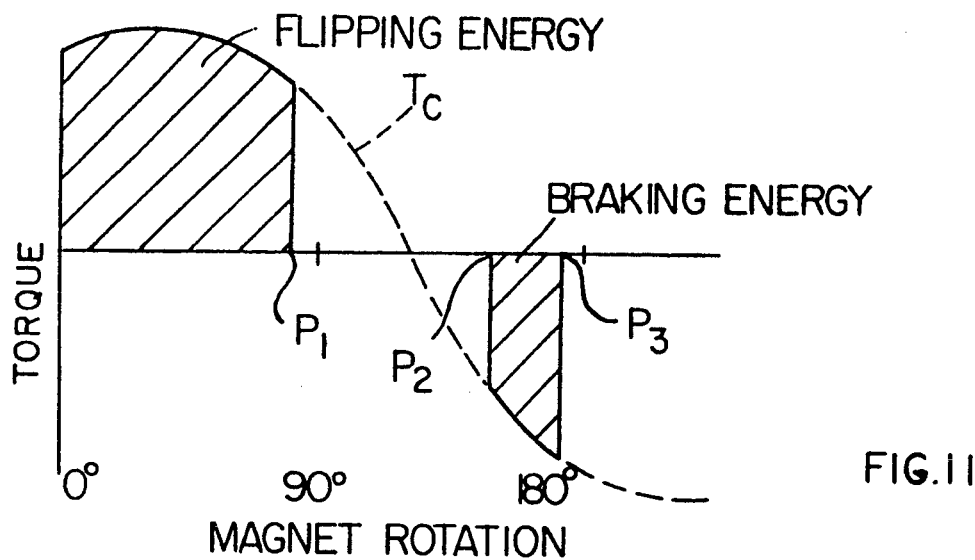
FIG. 11 is a diagram illustrating the torque applied to a permanent magnet by an electromagnetic coil.

As the bar magnet rotates from its initial position, it receives progressively less torque from the magnetic coil due primarily to the change in orientation in the magnetic field of the bar magnet with respect to the magnetic field of the coil, but also due in part to eddy currents set up in the bar magnet supporting frame member 250. The eddy currents are produced by the rotation of the bar magnet and produce a torque on the bar magnet opposite to its direction of rotation. If the coil were to remain energized during the entire 180° flip of the bar magnet, the bar magnet would pass a null point at which it experiences no torque due to the magnetism of the coil, and after which further rotation would produce a counter-torque or braking torque on the bar magnet which tends to slow its rotation. In a preferred embodiment of the invention, the coil is not energized continuously during a flip; rather it is initially energized only up to a first predetermined rotated position thereof, $P_1$, FIG. 11 which occurs prior to the time that the bar magnet reaches the null point in its rotation. After the coil is deenergized, the angular momentum of the bar magnet allows it to continue to rotate, although the rotation rate is slowed somewhat by the eddy currents set up in the surrounding support frame 250 and in the deenergized coil. At a second predetermined rotated position, $P_2$, detected based upon the sensor signal, the coil is reenergized in the same current direction as the initial energization. The second predetermined rotated position of the magnet is selected to be at a position beyond the null position, such that when the coil 330 is energized for the second time, it produces a braking torque which slows the rotation of the bar magnet 212. This braking torque is terminated after a preset time interval (which ends at a rotated position illustrated at $P_3$), after the coil has been energized for the second time. The coil is shorted at this point. The combination of the braking torque provided from the coil and the further braking torque provided by eddy currents in the support frame 250 and the shorted coil slows the rotation of the magnet as it approaches its new orientation 180° from its original orientation. As the bar magnet rotation brings its central polar plane PP into alignment with the magnetic detent bars, i.e. in coplanar relationship with vertical plane PP, the magnetic attraction between the bar magnet and the detent bars again tends to accelerate the magnet until it reaches a dead center orientation with respect to the detent bars. Thereafter, any further rotation of the magnet is resisted by the magnetic force between the bar magnet and detent bars. The oscillation which tends to occur as the bar magnet slightly overshoots alignment with the detent bar and then rebounds and re-rebounds, etc., is dampened by a magnetic field produced by the induced eddy currents in the support frame 250 and coil 330 which is always in opposition to the direction of rotation of the bar magnet. Using such a control scheme, it is possible to flip the bar magnet 212 and stabilize it sufficiently for properly writing or erasing a magneto-optical disk in a very short period of time, e.g. less than 8 milliseconds.

In optical drive environments, stray magnetic fields may be produced by other electromagnetic components in the optical drive unit. It thus may be necessary to energize the electric coil 330 at slightly different rotated positions and/or for slightly different time intervals when the magnet is flipped from a north pole to a south pole orientation than when it is flipped from a south pole to a north pole orientation.

Figure 12:
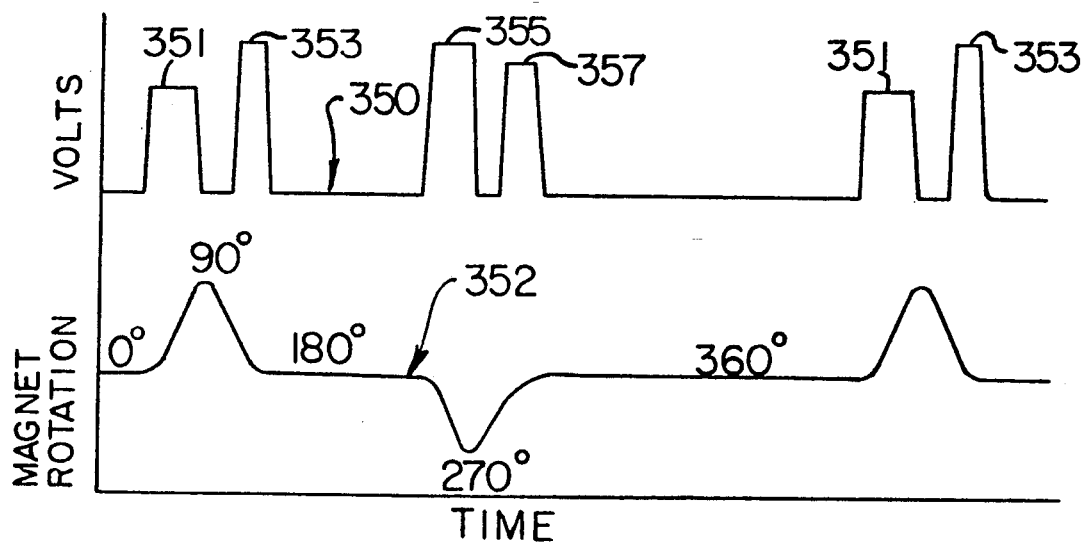
FIG. 12 is a graph showing the timing of electromagnet torque application and quadrature graph showing permanent magnet rotated position associated with the pulse signals.

In FIG. 12, curve 350 illustrated the timing of current pulses 351, 353, 355, 357 for energizing the coil during two successive flips of the bar magnet, i.e. from a write position to erase position to write position, or north-pole-up to north-pole-down to north-pole-up.

Curve 352 of FIG. 12 is a quadrature graph showing the rotated position of the bar magnet during successive flip cycles produced by the current pulses of curve 350.

Figure 13:
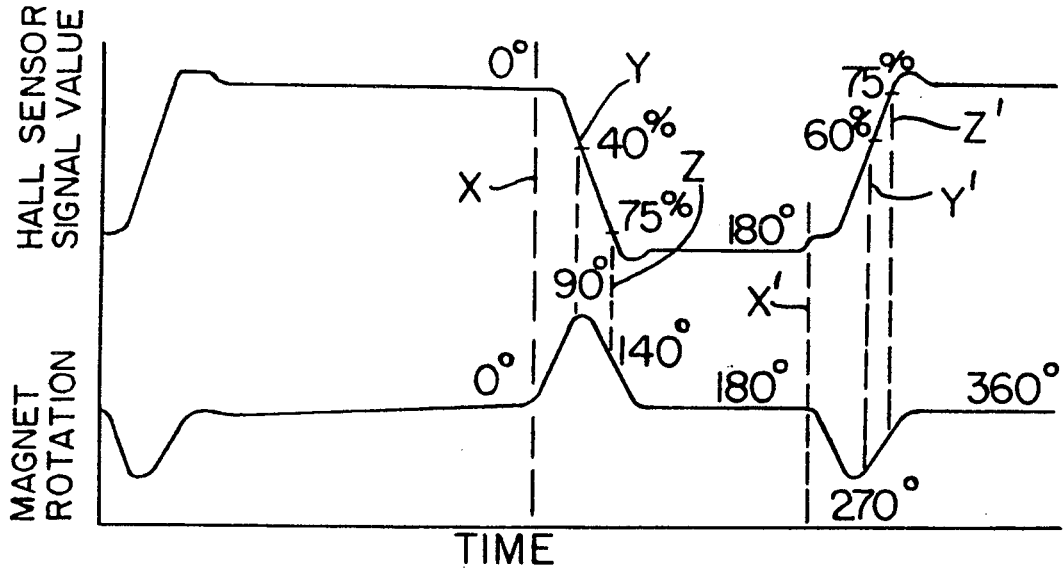
FIG. 13 is a graph showing the signal value of a Hall sensor and a quadrature graph showing the rotated position of a permanent magnet associated with the Hall sensor signal.

FIG. 13 illustrates the signal from a Hall effect sensor which is used to determine the timing of current pulses of curve 350 for energizing and deenergizing the coil.

As indicated in FIG. 13 the Hall effect sensor may be calibrated by rotating the bar magnet through 360° and storing the maximum and minimum signal values which are generated. The initial write flip pulse 351 is turned on, at "x", and left on until the Hall effect sensor signal output reaches 40% of its total range from maximum to minimum signal value, as indicated at "y". This 40% of signal range corresponds to approximately 80° of bar magnet rotation. At this point the coil is switched off. The write break pulse is switched on at 75% of the Hall sensor output or at approximately 140° of bar magnet rotation and remains on for a fixed period of time which in the embodiment illustrated is 1.4 milliseconds.

A similar scheme is used for the erase flip cycle. In the particular embodiment illustrated the erase flip initiating pulse is switched on at "x'" and remains on until reaching 60% of the Hall effect signal range which corresponds to approximately 100° of rotation at "y'". The erase break pulse is initiated at "z'" when the Hall effect sensor reaches 75% of its maximum range and remains on for a fixed period of 1.6 milliseconds. The exemplary difference in timing and duration of the write flip pulses and the erase flip pulses is due to differences in required flip energy caused by stray magnetic fields in the vicinity of the bar magnet.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A write-erase magnet assembly for a data storage device comprising:

permanent magnet means having a longitudinal axis and having a first longitudinally extending face portion with a first polarity and a second longitudinally extending face portion with a second polarity opposite said first polarity for alternately producing write and erase magnetic bias fields on an adjacently positioned data storage medium;

magnet support means for rotatably supporting said permanent magnet means about said longitudinal axis thereof;

passive magnetic detent means fixedly positioned relative to said longitudinal axis of said permanent magnet means for passively, magnetically producing a biasing torque on said permanent magnet means tending to orient the closer of said first and second face portions of said permanent magnet means in adjacent relationship with said detent means said permanent magnet means comprising a first biased position, associated with a writing operation, with said first face portion positioned adjacent said magnetic detent means and a second biased position, associated with an erasing operation, with said second face portion positioned adjacent said magnetic detent means;

electromagnet means disposed proximate said permanent magnet means for applying a magnetic torque thereto for flippingly reorienting said permanent magnet means between said first and second biased positions; and said electromagnet means being energized only during flipping operations occurring between said writing and erasing operations.

2. The write-erase magnet assembly of claim 1 further comprising electromagnet control means for adjustably energizing said electromagnet means.

3. The write-erase magnet assembly of claim 2 wherein said electromagnet control means comprises:

sensing means for continuously sensing the exact relative rotated position of said permanent magnet means and generating a sensing signal representative thereof; and data processing means for receiving and processing said signal from said sensing means and for generating a control signal for adjustably energizing said electromagnet means based upon said sensing signal.

4. The write-erase magnet assembly of claim 3 wherein said sensing means comprises a Hall effect sensor.

5. The write-erase magnet assembly of claim 3 wherein said electromagnet means comprises an electric coil defined by a plurality of electrical windings, said coil having a central coil plane disposed generally parallel to said windings and having a central coil opening.

6. The write-erase magnet assembly of claim 5 wherein said permanent magnet means is positioned within said central opening of said electric coil with said permanent magnet means central longitudinal axis disposed parallel said central coil plane.

7. The write-erase magnet assembly of claim 6, said data storage medium comprising a disk having a disk plane, said electric coil and said detent means and said disk plane being constructed and arranged such that said first and second face portions of said permanent magnet means are disposed at an oblique angle relative to said central coil plane when said permanent magnet means is in either of said biased positions and such that said disk plane is disposed at said oblique angle with said central coil plane.

8. The write-erase magnet assembly of claim 7 wherein said oblique angle is approximately 45 degrees.

9. The write-erase magnet assembly of claim 7 further comprising eddy current dampening means operatively associated with said permanent magnet means for producing a torque thereon during rotation thereof directed opposite to the direction of rotation for slowing the motion of said permanent magnet means after application of torque thereto by said electromagnet means.

10. The write-erase magnet assembly of claim 9 wherein said eddy current dampening means comprises a nonmagnetic metal member with a cavity therein and said electric coil; said permanent magnet means and said electric coil being positioned within said nonmagnetic metal member cavity.

11. The write-erase magnet assembly of claim 10 wherein a surface portion of said nonmagnetic metal member is disposed generally parallel to said central coil plane of said electric coil and immediately adjacent thereto.

12. The write-erase magnet assembly of claim 11 wherein said magnetic detent means comprises a magnetic metal member received in a groove in said nonmagnetic metal member.

13. The write-erase magnet assembly of claim 1 wherein said data storage device is a magneto-optic drive and said data storage medium is an optical disk.

* * * * *